J. A. DARST & M. BRITTAIN.
HOSE HOLDER.
APPLICATION FILED OCT. 15, 1910.

996,464.

Patented June 27, 1911.

Inventors
Jacob A. Darst
Manroe Brittain
By Victor J. Evans,
Attorney

Witnesses

UNITED STATES PATENT OFFICE.

JACOB A. DARST AND MONROE BRITTAIN, OF CALDWELL, KANSAS.

HOSE-HOLDER.

996,464.  Specification of Letters Patent. Patented June 27, 1911.

Application filed October 15, 1910. Serial No. 587,322.

*To all whom it may concern:*

Be it known that we, JACOB A. DARST and MONROE BRITTAIN, citizens of the United States of America, residing at Caldwell, in the county of Sumner and State of Kansas, have invented new and useful Improvements in Hose-Holders, of which the following is a specification.

This invention relates to holders for garden hose, the object of the invention being to provide novel and efficient means for adjustably holding the nozzle of the hose so that the water can be delivered in any direction.

A still further object of the invention is to provide an adjustable member for supporting the nozzle and a base member rotatably supporting the said adjustable member so that the adjustable member and the hose can be conveniently adjusted without changing the position of the base member.

Figure 1:
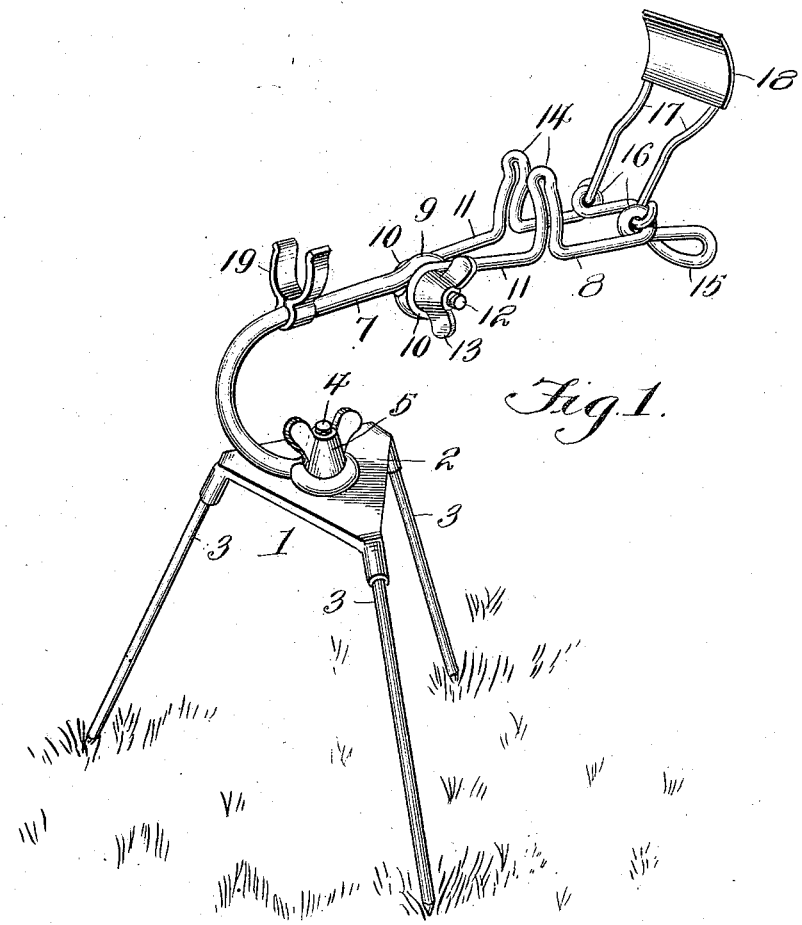
Figure 2:
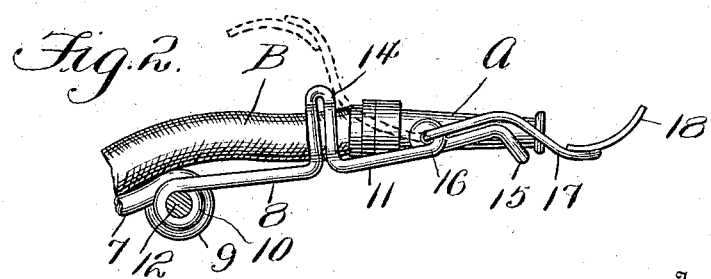

In the drawing, forming a portion of this specification and in which like numerals of reference indicate similar parts in the several views:—Figure 1 is a perspective view of our improved hose holder. Fig. 2 is a detail section through the upper arm of the adjustable member showing the application of the hose thereto and illustrating the adjustment of the spray arm with respect to the nozzle so as to form a spray.

Our improved hose holder comprises a base member or stand 1 which is constructed to provide a head 2 and a plurality of supporting legs 3. The head 2 is provided with an upstanding post 4 which is threaded for the adjustment thereon of a clamping nut 5.

The adjustable member 6 of the holder comprises a lower arm 7 and an upper arm
8. The lower arm is curved rearwardly from the head 2 and then upwardly and forwardly and at its extremity it is constructed to form an eye 9 which alines with similar eyes in the integrally connected sides 11 of the upper arm 8. A clamping bolt 12 extends through the alining eyes 9 and 10 and the nut 13 thereof can be conveniently adjusted to hold the upper arm in the required adjusted position. Each side member 11 of the upper arm is formed intermediate of its length to provide one jaw of a hose-receiving fork 14. At the upper end the said upper arm has its side members connected by an offset arcuate portion 15 which provides a seat for the nozzle A of the hose B shown in Fig. 2 of the drawing. Adjacent to the seal-forming portion of the upper arm the side members 11 are formed to provide alining eyes 16 to which the shank members 17 of a spray plate 18 are pivotally connected. The spray plate is of concavo-convex form, having its concaved surface immediately in front of the nozzle, as shown in Fig. 2 of the drawing so that the full force of the stream is applied directly to the said concaved surface. From this construction the most effective spray can be obtained.

The spray plate, when not desired for use, may be moved to the position shown in dotted lines in Fig. 2. The clamping nut 5 may be operated to enable the operator to move the upper arm of the adjustable member at any desired angle with respect to the base member or head 2. By rotatably mounting the lower arm of the adjustable member on the head 2 the said member and the hose may be rotated horizontally without lifting the base member, as will be understood. The lower arm of the adjustable member is provided with coöperating hose-gripping jaws 19.

We claim:—

1. A hose holder comprising a supporting member, a horizontally adjustable arm thereon, a vertically adjustable arm on the first arm, the said second arm being provided at its outer end with a downwardly curved nozzle-supporting portion, and a clamp formed on the second arm immediately at the rear of the said nozzle-supporting portion.

2. A hose holder comprising a supporting member an arm horizontally adjustable thereon and provided with a hose receiving clamp, a second arm comprising a member formed to provide substantially identical side portions which are pivoted at their inner ends to the outer extremity of the first arm, the said side members of the second arm being connected with each other by a downwardly curved nozzle-supporting portion, and a nozzle clamp on the second arm and disposed immediately at the rear of the said curved nozzle supporting portion.

In testimony whereof we affix our signatures in presence of two witnesses.

JACOB A. DARST.
MONROE BRITTAIN.

Witnesses:
L. D. RICHARDS,
C. A. HOUGH.